(12) United States Patent
MacGillivray

(10) Patent No.: US 8,059,122 B1
(45) Date of Patent: Nov. 15, 2011

(54) CARTESIAN MESH GENERATION TECHNIQUE

(75) Inventor: Jeff MacGillivray, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 904 days.

(21) Appl. No.: 12/054,602

(22) Filed: Mar. 25, 2008

(51) Int. Cl.
*G06T 17/00* (2006.01)
(52) U.S. Cl. ........................................................ 345/424
(58) Field of Classification Search ........................ None
See application file for complete search history.

(56) References Cited

OTHER PUBLICATIONS

J. R. Shewchuk, "Adaptive Precision Floating-Point Arithmetic and Fast Robust Geometric Predicates", 1996, CMU-CS-96-140, School of Computer Science, Carnegie Mellon University.*

J. T. MacGillivray, "Trillion Cell CAD Based Cartesian Mesh Generation for the Finite Difference Time Domain Method on a 4 Gigabyte Linux Workstation", Oct. 17, 2007, IEEE, Workshop on Computational Electromagnetics in Time-Domain, 2007. CERMTD 2007.*

Srisukh (Y. Srisukh, J. Nehrbass, F. L. Teixeira, J. F Lee, and R. Lee, An Approach for Automatic Grid Generation in Three-Dimensional FDTD Simulations of Complex Geometries.
IEEE Antenna's and Propagation Magazine, vol. 44, No. 4, pp. 75-80, Aug. 2002.

* cited by examiner

*Primary Examiner* — Ulka Chauhan
*Assistant Examiner* — Robert Bader
(74) *Attorney, Agent, or Firm* — Kenneth E. Callahan; James M. Skorich

(57) ABSTRACT

A highly accurate and robust cubic cell mesh generator "Cubegen" capable of a trillion plus cell meshes on a single processor 4-Gigabyte main memory workstation has been developed. The cells are generated in Yee format for the Finite Difference Time Domain method. Three key techniques were employed to achieve this capability: a highly efficient data storage ray tracing method, a highly accurate ray-facet intersection test, and a novel exact arithmetic tie-breaking algorithm for rays intersecting facet edges and vertices.

1 Claim, 7 Drawing Sheets

CARTESIAN MESH GENERATION TECHNIQUE

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

This invention generally relates to Computer Aided Design based (CAD-based) Cartesian mesh generators, and in particular to a highly accurate and robust cubic cell mesh generator capable of generating over 1 trillion cells.

Computer aided design (CAD) software is used to model physical objects. Most CAD software generates files in Standard Tessellation Language (STL) format. Each object in the CAD model is encompassed by a triangular facet surface mesh. The STL file locates the triangular facets via Cartesian coordinates (x, y, z) of the three vertices of each triangle, uniquely defining a plane. FIG. 1a shows a facet defined by vertices 1, 2, and 3. The vertices are numbered via the STL format convention. This facet lies in the x-y plane. Vectors can be drawn from points 1 to 2, from 2 to 3, and from 3 to 1 as indicated by the dashed lines. By the right-hand rule, the sense of this facet is in the −z direction.

One mesh generation technique involves defining a volume 10 to encompass a solid object of interest 11. Volumes are usually divided into polyhedrons. Here, the volume is subdivided into small perfect cubes 12 or cells as depicted in FIG. 1b. By casting rays 13 in one of the coordinate directions (−z in FIG. 1b) and saving the intersection locations for each facet hit, the surfaces of each body in the volume can be identified. Once the surfaces are known, the solid is defined and can be filled in as it is written to a file. The space between a ray entering a facet (starting surface location) and exiting another facet (ending surface location) within the volume 10 defines the thickness of the solid in that space. The space between the entry facet and the exit facet is filled in by a continuous line of identical cubes as it is written to a file so that the computer main memory only stores the entry and exit locations requiring minimal main memory. By launching a ray 13 perpendicular from each cell face center of a volume domain face, all shapes are resolved. If needed, rays can be cast in all three coordinate directions to better define the shapes. Since this method only requires memory storage of surface position information, the total number of cells can be extremely large, allowing for a large electrical volume size while maintaining very high resolution. (The electrical volume size is the computational volume size relative to the electromagnetic wavelength being simulated.) However, the accuracy and robustness of this method greatly depends on ray-facet intersection tests that are a key element of the present invention.

The present invention is readily adaptable to the modeling of electromagnetic fields emanating from various antenna configurations and the interaction of electromagnetic radiation with solid objects. This is a complex problem involving the solution of Maxwell's Equations and is greatly simplified if the solid object involved can be defined in terms of perfect cubes since the solution of Maxwell's Equations of a cube is relatively simple. Currently, generating a highly accurate CAD based Cartesian mesh with an extremely large number of cells, requires a massively parallel computing resource. The present invention discloses a simplified method of solving this type of problem involving a memory efficient ray tracing method, a highly accurate ray-facet intersection test, and a novel exact arithmetic tie-breaking algorithm for rays intersecting facet edges and vertices.

SUMMARY OF THE INVENTION

The present invention discloses a robust, CAD-based, highly accurate and fast Cartesian mesh generation technique for a colossal number of cells capacity using a minimal single processor computing resource. The cells are generated in Yee format for the Finite Difference Time Domain (FDTD) method. There are three key techniques presented that achieve this capability: a highly efficient data storage ray tracing method, a highly accurate ray-facet intersection test, and a novel exact arithmetic tie-breaking algorithm for rays intersecting facet edges and vertices.

DESCRIPTION OF THE PREFERRED EMBODIMENT

The present invention involves a cubic cell mesh generator capable of a trillion plus cell meshes on a single processor 4-Gigabyte main memory workstation. Unlike unstructured codes with CAD-based mesh generation tools, FDTD modelers often build meshes using time consuming and cumbersome methods. However, Srisukh (Y. Srisukh, J. Nehrbass, F. L. Teixeira, J. F. Lee, and R. Lee, "An Approach for Automatic Grid Generation in Three-Dimensional FDTD Simulations of Complex Geometries," *IEEE Antenna's and Propagation Magazine*, vol. 44, no. 4, pp. 75-80, August 2002.) demonstrated that a ray tracing method can be implemented on surface facet files generated by CAD software yielding a cubic cell Yee mesh for FDTD. Srisukh does not, however, disclose the efficient memory usage of this algorithm, allowing for a massive number of cells with only a minimal amount of computer memory. By employing a Boolean operation facet-ray intersection test commonly used in computational geometry, and a novel exact arithmetic tie-breaker algorithm for ray intersections on facet edges and vertices, a highly robust, fast and accurate mesh generation code has been developed.

Highly Efficient Ray Tracing Data Storage

As presented in Srisukh, by casting rays in one of the coordinate directions and saving the intersection locations for each facet hit, the surfaces of each body in the volume can be identified. Once the surfaces are known, the solid is defined and can be filled in as it is written to a file. By launching a ray from each cell face center of a volume domain face, all shapes are resolved. For thin shapes with a dimension smaller than the width of a cell, it may be necessary to cast rays in two or all three coordinate directions. Since this method only requires memory storage of surface position information, the number of cells and electrical volume size can be very large while maintaining very high resolution. However, the accuracy and robustness of this method greatly depends on ray-facet intersection tests described below.

Boolean Ray-Facet Intersection Test

Figure 1A:
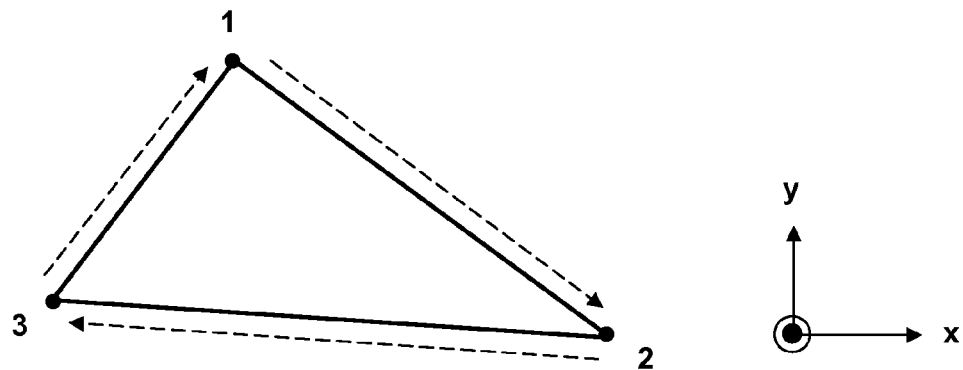
FIG. 1a shows a typical facet generated by CAD software in Standard Tessellation Language (STL) format.
Figure 1B:
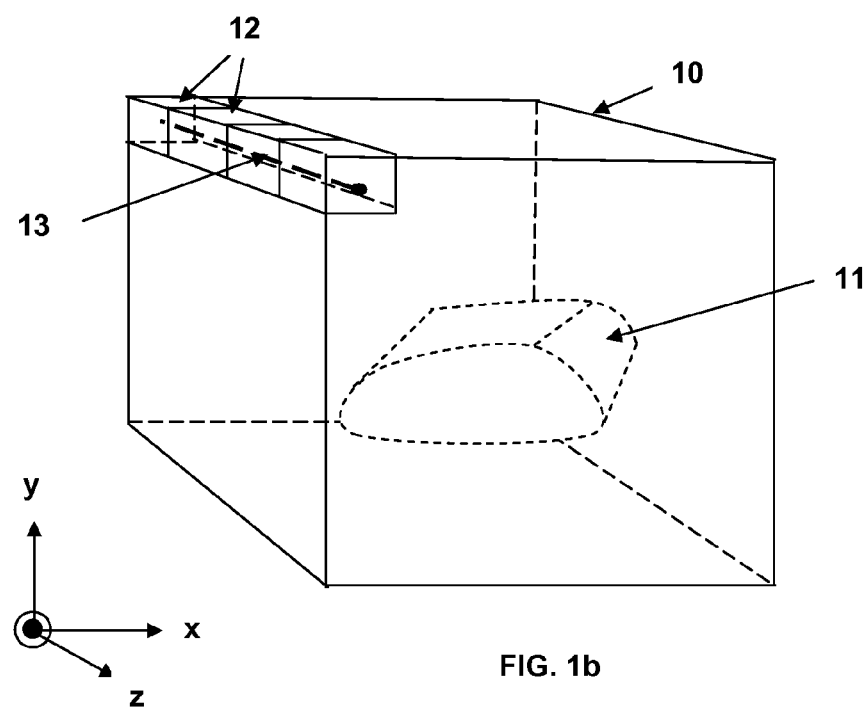
FIG. 1b is an example of a solid body encompassed by a volume that is subdivided into small cubic cells.
Figure 2:
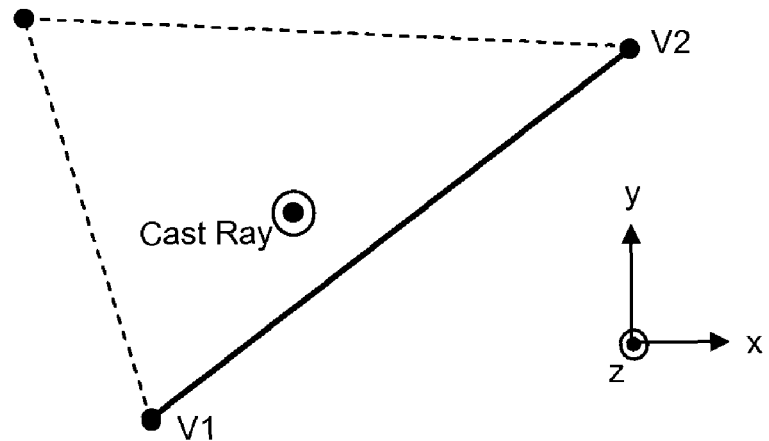
FIG. 2 shows a z-directed ray passing near a facet edge defined by two vertices.

When a ray encounters a facet, a test must be performed to determine whether the ray passes through the facet interior, a facet edge, a facet vertex, or passes outside the facet. The accuracy of this test is crucial when determining the starting and ending surfaces of a body as a ray is cast. If a body surface starting point is missed, the ending surface will mistakenly be seen as a starting point generating cells outside of a body instead of interior to it. FIG. 2 shows a z-directed ray passing near a facet edge defined by two vertices, V1 and V2.

Three Orientation Tests. Because of machine round off errors, a highly accurate test without division must be implemented. This is accomplished by implementing the orientation test for each facet edge relative to the ray coordinates:

$$\text{Orientation} = \begin{vmatrix} V1_x - Ray_x & V1_y - Ray_y \\ V2_x - Ray_x & V2_y - Ray_y \end{vmatrix} \quad (1)$$

The ray position is to the left of the facet edge if the determinant in (1) yields a positive value, to the right of the facet edge for a negative value, and on the facet edge or a vertex for a value of zero. This same test is now performed with the other two facet edges. The ray passes through the interior of the facet if one of two conditions is satisfied: the orientation test is greater than zero for all three ray-facet edge tests, or the orientation test is less than zero for all three ray-facet edge tests. If only one of the three orientation tests is zero, the ray is on the corresponding facet edge. If only two of the orientation tests are zero, the ray is on the vertex shared by the two corresponding edges. If all three orientation tests are zero, the ray is in the same plane as the facet. While the sign of the determinant can be solved exactly via rather complicated exact arithmetic algorithms, the simple test above has proven to be far more than sufficient for FDTD simulation modeling.

Novel Tie-Breaking Algorithm

A tie-breaking algorithm is crucial for handling cases where the ray passes exactly through the edge or vertex of a facet. Two facets can share the same edge and multiple facets can share the same vertex. Thus, if a ray hits multiple facets at the same location, a tie-breaker must be introduced so that the ray trace does not incorrectly place an ending surface location at the same starting location, i.e. only one "hit" should be saved. As in the orientation test, this test also must be highly accurate to minimize or better still, eliminate the effects of machine round off error. The test determines which is the unique facet of the two facets intersected by the ray at adjacent facet edges or which is the unique facet at a shared vertex. Only the coordinates of unique ray-facet intersections are saved. If two adjacent facets are in the same surface (starting or ending), one must be selected and the other discarded and that choice depends on whether the facets are part of a starting or ending surface. If one of the adjacent facets belongs to a starting surface while the other belongs to an ending surface, the test should select both as unique or discard both.

The following tie-breaker algorithm is based on the Standard Tessellation Language (STL) CAD file format, a multi-material format that nearly all CAD software generates. STL files consist of triangular facets with vertices numbered via the right-hand rule. The below method will work on other formats as long as the facets are numbered using the right-hand rule.

1. Two Adjacent Facets in the Same Surface. First consider the case where a ray intersects a common edge of two facets, not through a vertex. It must be determined whether this is a single or double hit. If one of the two hits is a starting face, the other hit at the same location may belong to the same starting face (as in FIG. 3) or it may belong to an ending face (as in FIG. 4).

Figure 3:
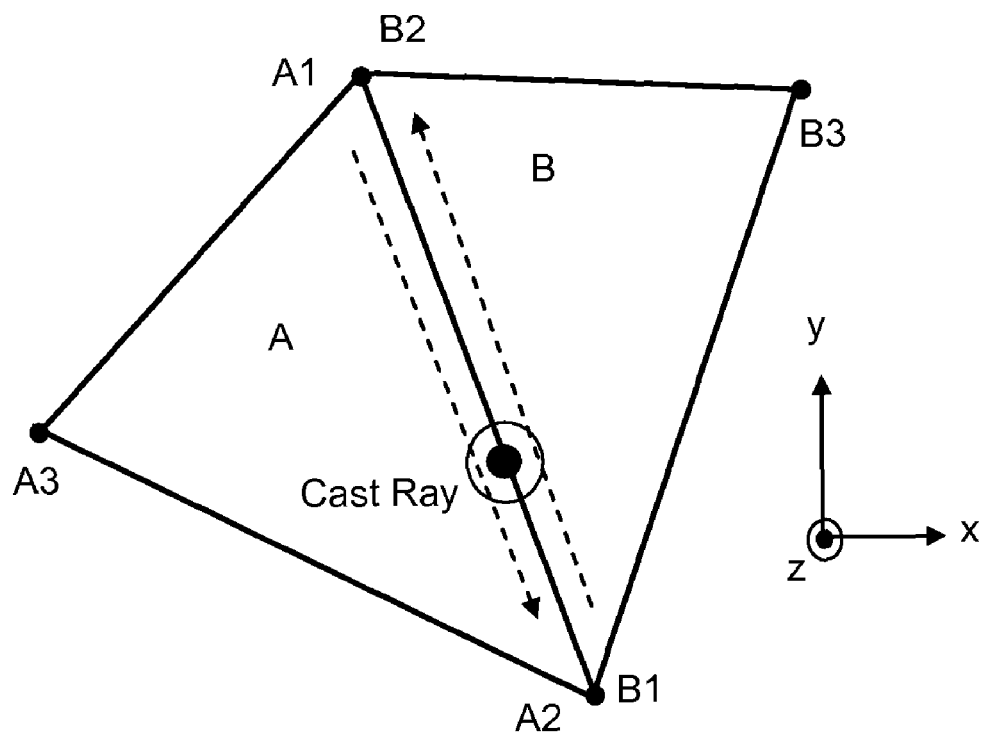
FIG. 3 shows a ray cast in the z-direction that intersects the common edge between two facets of a starting surface.
Figure 4:
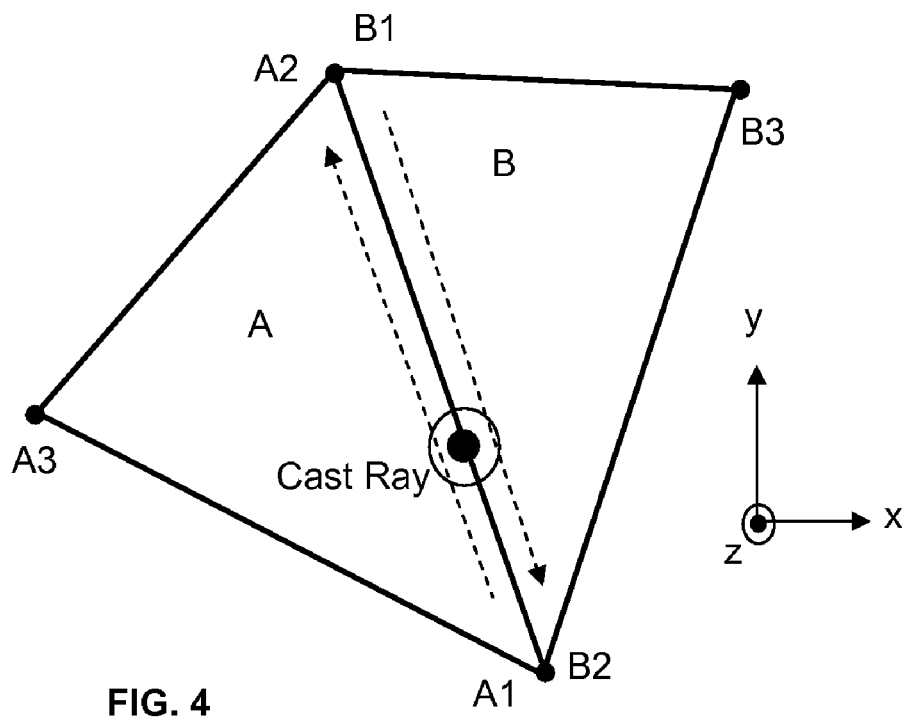
FIG. 4 shows a ray cast in the z-direction that intersects the common edge between two facets of an ending surface.

Because each facet conforms to the right hand rule, it can be determined whether a facet is part of a starting or ending surface. (If all three orientation tests are greater than or equal to zero and the cast ray is in a negative direction, the facet is a starting surface, i.e., the ray is entering a solid. If all three orientation tests are less than or equal to zero and the cast ray is in the negative direction, it is an ending surface, i.e., exiting a solid. The opposite applies for a ray cast in a positive direction.) Shown in FIG. 3 is the case where a cast ray intersects the common edge between two facets. In this example the two facets are part of the same starting surface since both have a negative orientation (all three orientation tests are less than or equal to zero for each facet). This can also been seen by simply applying the right hand rule.

If the two facets are part of the same surface, a tie-breaker test must be applied so that only one of the two hits is retained. One of the hits can be thrown out by once again using the right-hand rule. If a vector is defined for each facet along the common edge using the coordinates of each facet, the two vectors will point in opposite directions because of the right-hand rule.

a. Starting Surface: make facet with +x vector component unique. In FIG. 3, the ray is cast in the +z-direction and intersects the common edge between two facets of a starting surface. Only one of the two vectors along the adjacent edge can have a positive x-directed component, in this case the vector belonging to facet A (comprising vertices A1, A2, and A3). If the x-component is zero (both vectors would have a zero x component since they are parallel but in opposite directions), then only one of the two vectors would have a positive y-directed component. This test makes the facet with a +x vector component unique or if x=0, the facet with the +y vector component is unique. Facet A in FIG. 3 is selected and its ray-facet intersection coordinates saved since its vector has a positive x-component. However, facet B (comprising vertices B1, B2, and B3) would have been selected if the x-component of the vectors were zero since its y vector component is positive. It does not matter which facet, A or B, is found to be unique. What is important, however, is that the test designates only one facet as unique and saves its coordinates.

b. Ending Surface: make facet with −x vector component unique. Conversely, the two facets in FIG. 4 both belong to the same ending surface since all three orientation tests for both facets are greater than or equal to zero. Once again, a vector is defined for each facet along the common edge using the coordinates of each facet. However, for an ending surface, the facet with a negative x-directed vector component is considered unique and its intersect coordinates saved. Here, facet A has a −x vector component and is saved while facet B necessarily has a +x vector component and is discarded. If the x component were zero, then only one of the two vectors would have a negative y-directed component. Facet B would have been selected as unique in FIG. 4 since its vector has a negative y-component. Thus, the test applied to an ending surface is opposite of that applied to a starting surface. Why this is necessary will become apparent for the next case. Again, it is important that the test designates only one facet as unique.

Figure 5:
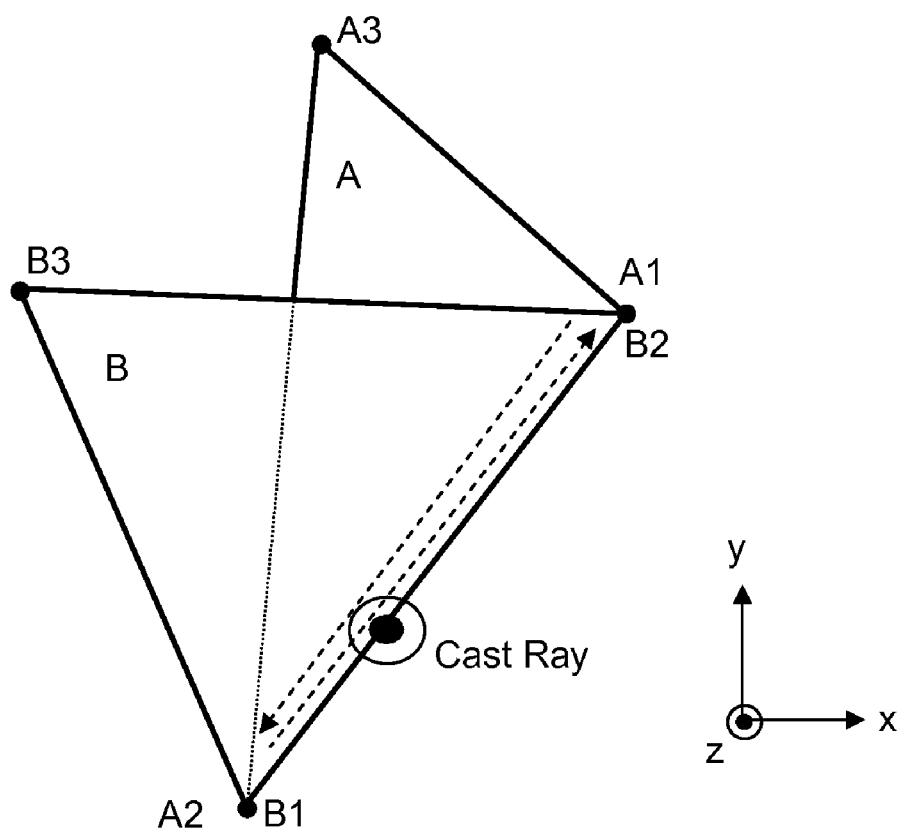
FIG. 5 shows a ray cast along the z-coordinate that intersects the common edge between two facets. Facet A has a negative orientation and is therefore a starting surface. Facet B has a positive orientation and is therefore an ending surface.

2. Two Adjacent Facets in Different Surfaces. Now consider the case where a ray intersects a common edge of two facets that belong to two different surfaces as shown in FIG. 5. All three orientation tests are less than or equal to zero for facet A (a starting surface) and greater than or equal to zero for facet B (an ending surface). When the starting surface tie-breaker test is applied to facet A, it is not considered a hit because it has a −x vector component. Because the ending surface tie-breaker test is opposite, this is also not considered a hit since it has a +x vector component. Therefore, neither facet is considered unique, and no cell or cube is placed in this location. If FIG. 5 is rotated counter-clockwise about the z-axis so that A1 is above A2 and aligned with the y-axis, then the x vector component is zero. Facet A, still a starting surface, has a −y vector component so is not unique under the test. Facet B, still an ending surface, has a +y vector component and is also not unique. Thus, no cell is placed at the intersection of the two facets. If, however, FIG. 5 is rotated clockwise about the z-axis so that A2 is above A1 and aligned with the y-axis, then the x vector component is again zero, but the test gives a different result. Facet A is still a starting surface but now has +y component and is considered unique. Facet B is still an ending surface but now has a −y vector component so is also considered unique. For this case, one cell is placed at the intersection. It is roughly just as accurate to place a single cell here as it is to place no cell since the cell center is right on the edge of the object. What is important is that the test recognizes that one or no cell is placed here.

Figure 6:
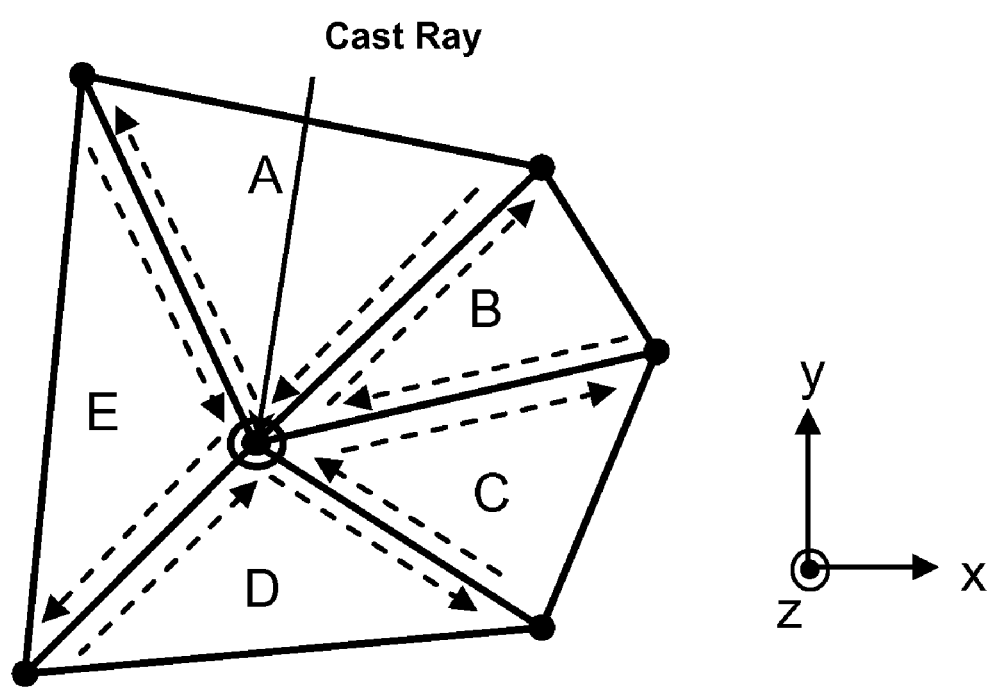
FIG. 6 shows a ray cast along the z-coordinate that intersects a vertex shared by multiple facets. Only facet D has two vectors that intersect the vertex with positive x-directed components.

3. Ray Intersects a Vertex. Finally, consider the case where a ray intersects a vertex shared by multiple facets as shown in FIG. 6. Using the orientation test, each facet is placed in one of two groups, a starting or ending surface. For the example in FIG. 6, facets A, B, C, and E are part of a starting surface. Once again, the right hand rule can be used to identify one of the facets as unique as follows. Construct a vector for each edge of each facet that intersects the vertex. Thus, each facet has two vectors that intersect the vertex. However, only one of the facets can have two vectors with two positive x-directed components, in this case facet D. As previous, for cases where an x-directed component is zero, the sign of the y-directed component can then be considered. When multiple facets share the same vertex of an ending surface, the facet with two negative x-directed components is identified as unique.

These two tie-breaking tests, ray-edge and ray-vertex intersections, can be combined into one FORTRAN 90 function with only four lines of code. Furthermore, only comparisons of relative number values are needed, eliminating machine round off errors, yielding an exact arithmetic test. Often tie-breaker tests are avoided with more complicated and less accurate methods such as perturbing the ray position or by moving the vertex positions ahead of time. Both of these methods often yield further problems because the new ray or vertex positions create new tie-breaker cases. However, this novel test of the present invention is exact, fast and very simple to implement.

Ray Tracing Flowchart

Figure 7:
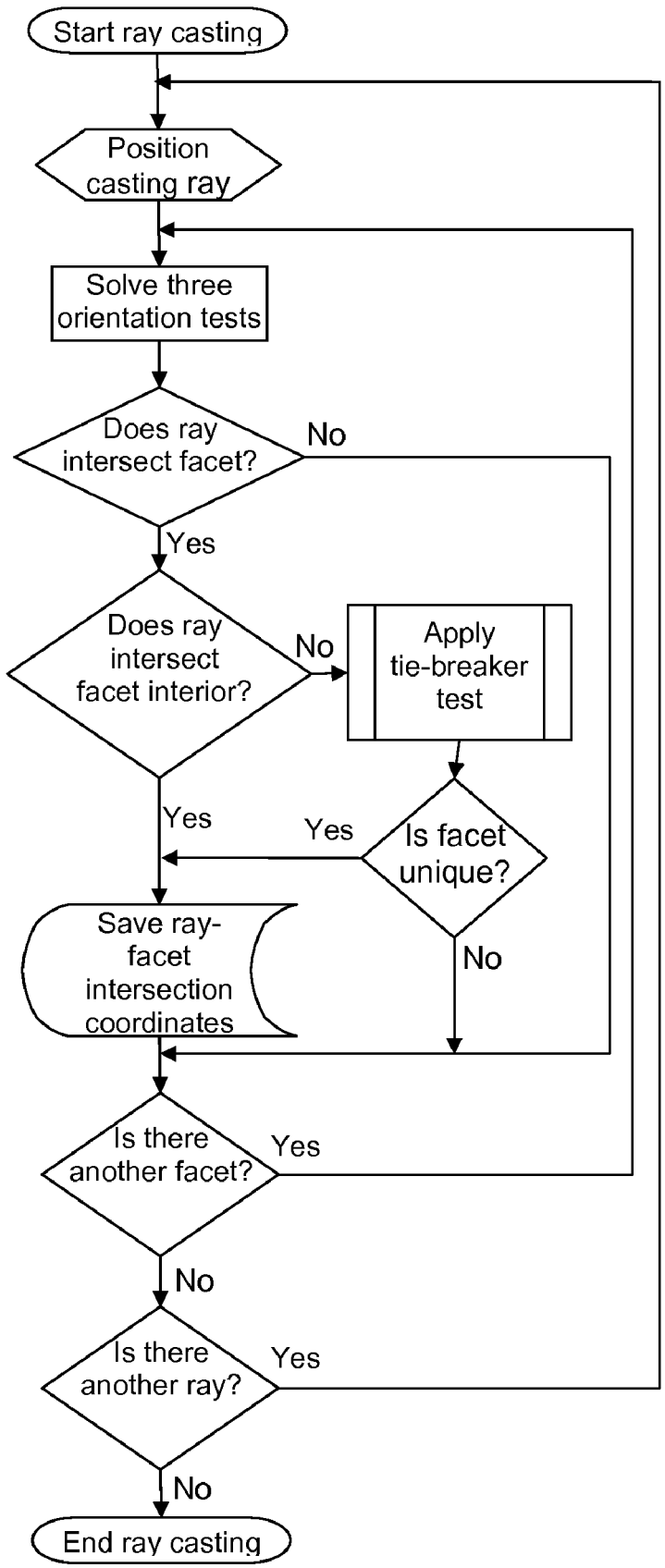
FIG. 7 is a flowchart of the orientation and tie-breaker tests integrated into a ray tracing loop for rays cast in one of the three coordinate directions.

Shown in FIG. 7 is a flowchart of the orientation and tie-breaker tests integrated into a ray tracing loop. The outermost loop moves the ray starting position to each cell face center of a volume domain face. Each ray is then cast along the coordinate normal to this face. The next loop then cycles through each facet of a solid from the STL file. If the ray passes outside a facet the loop is incremented to the next facet. If a ray passes through the interior of a facet, the ray-facet intersection coordinates are stored. If the ray passes through a facet edge or vertex, the facet is tested for uniqueness after which the intersection coordinates are saved only if it is unique.

One Trillion Cell Airbus Mesh

Figure 8A:
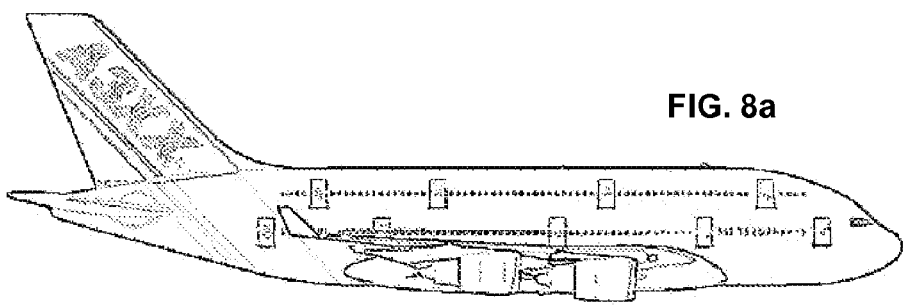
FIG. 8 is a mesh of an A3XX-50 Airbus used to demonstrate the capabilities of the present invention. A side view (a), front view (b) and overhead view (c) are shown.
Figure 8B:
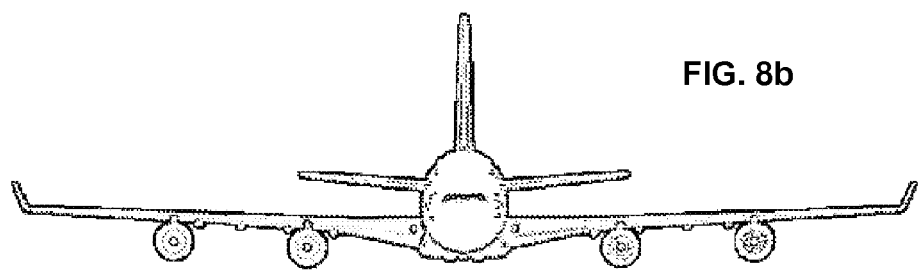
Figure 8C:
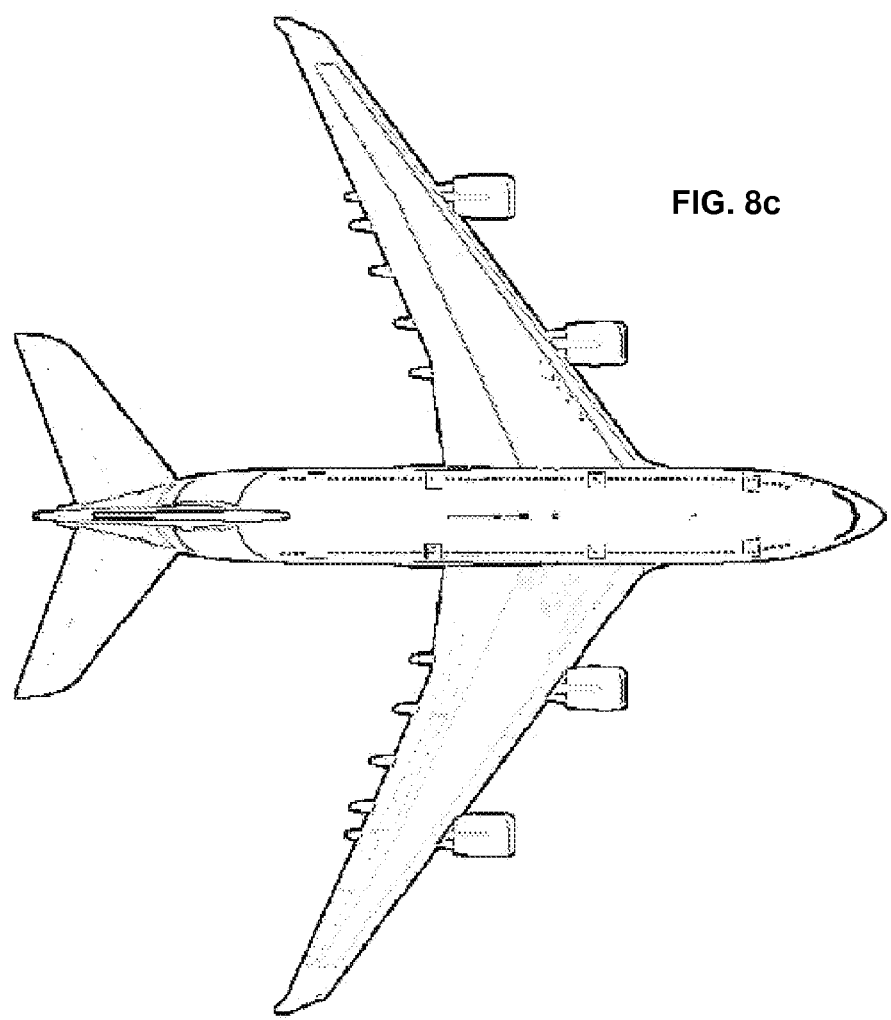
Figure 9A:
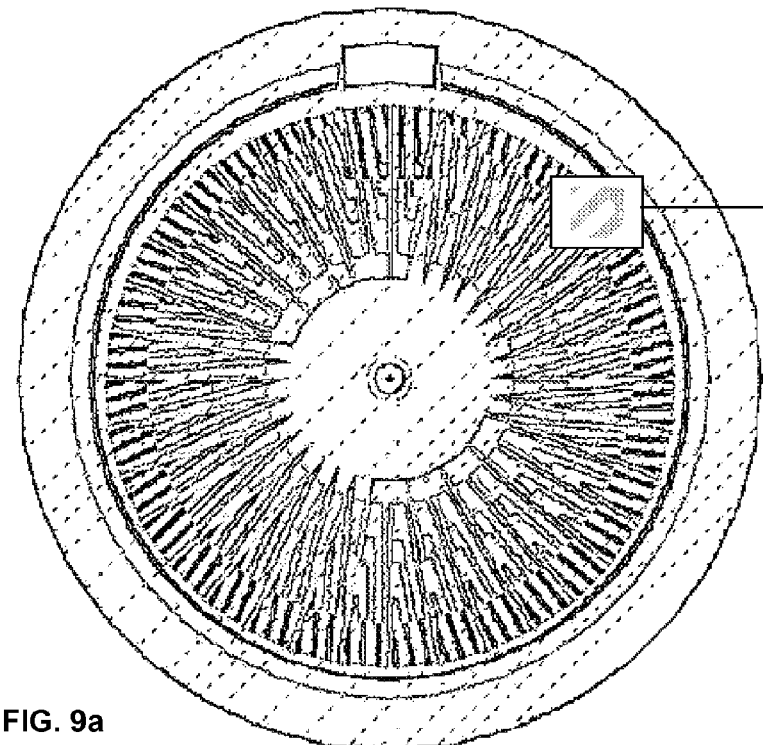
FIG. 9a is a mesh of an engine from the A3XX-50 Airbus of FIG. 8.
Figure 9B:
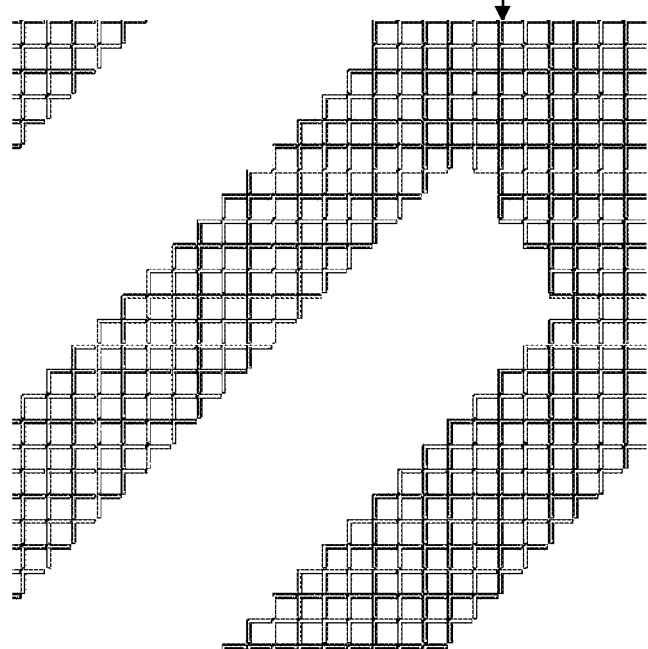
FIG. 9b is a magnified mesh of a part of an engine from the A3XX-50 Airbus of FIG. 8 so that individual cells can be seen.

An STL file of an A3XX-50 Airbus was used to demonstrate this capability. This aircraft was chosen because it is a well known very large object with a complex shape, approximately 68 meters long by 80 meters wide by 24 meters tall. Using a cell size of 5 mm, this yields over 1 Trillion cells. The resulting mesh is shown in FIG. 8 with side (a), front (b), and overhead views (c). The three full mesh pictures appear to have jagged edges due to limitations of the video display hardware. However, the close up pictures of the engine (FIG. 9a) show more detail with smoother edges although still not magnified enough for the video to display single cells. Finally, a portion of the engine interior is magnified so that individual cells can be seen (FIG. 9b). This run was completed on a single processor 4 Gigabyte 3.6 GHz Intel Xeon in less than 10 hours. The result shown was the first mesh run attempt and was successful.

This CAD-based mesh generation is an extremely powerful tool for FDTD when using the efficient memory storage ray tracing and highly accurate ray-facet intersection tests of the present invention. Colossal meshes can be easily and accurately generated. At such high resolutions, the often criticized stair stepping and numerical dispersion errors become negligible for many problems.

The invention claimed is:

1. A method for generating a Cartesian mesh model of an object, comprising a processor performing the steps of:
   a. receiving an ordered set of data points that describe the object in CAD-based Standard Tessellation Language (STL) format, wherein the object is described by a triangular facet surface mesh, each triangular facet having three vertices (V1, V2, V3) that uniquely define a plane and three facet edges defined by lines drawn between V1 and V2, V2 and V3, and V3 and V1;
   b. defining a volume domain in Cartesian coordinates (x, y, z) that encompasses said object, said volume being subdivided into small perfect cubic cells;
   c. casting ray along one of the coordinate directions originating from a cell face center of a volume domain face normal to the cast ray, to determine the intersection of said ray with said triangular facet;
   d. testing ray to see if it passes through said facet by applying the orientation test for the V1V2 facet edge relative to the ray coordinates given by the determinant of the orientation test matrix for the coordinate direction of the cast ray
   and similarly for the V2V3 and V3V1 facet edges; if all three orientation tests are greater than zero or all three are less than zero, proceed to step e; if only one orientation tests is zero, wherein the ray intersects an edge, or only two of the orientation tests are zero, wherein the ray intersects a vertex, then jump to step h; otherwise jump to step f;

e. saving the ray-facet intersection coordinates; proceed to f;

f. testing to see if there is another facet to test with the current ray position; if yes, jump to d and apply test to next facet; if no, proceed to g;

g. testing to see if there is a next unused cell face center in said volume domain face to cast a ray; if no proceed to step i; if yes, position ray to next cell center face and jump to step c;

h. applying a tie-breaker test to determine if the said facet is unique: (1) if said ray intersects said facet edge of a starting surface and the edge has a +x component or if the x component is zero and the facet edge has a +y component, jump to step e; if false jump to step f; (2) if said ray intersects said facet edge of an ending surface and 5 the edge has a −x component or if the x component is zero and the facet edge has a −y component, jump to step e; if false jump to step f; (3) if said ray intersects said facet vertex of a starting surface and both edges intersecting the vertex have +x components or if one of the x components is +x and the other zero with a +y component, jump to step e; if false jump to step f; (4) if said ray intersects said facet vertex of an ending 10 surface and both edges intersecting the vertex have −x components or if one of the x components is −x and the other is zero with a −y component, jump to step e; if false jump to step f;

i. end ray casting.

* * * * *